(12) United States Patent
Huh et al.

(10) Patent No.: US 12,366,733 B2
(45) Date of Patent: Jul. 22, 2025

(54) OPTICAL IMAGING SYSTEM

(71) Applicant: Samsung Electro-Mechanics Co., Ltd., Suwon-si (KR)

(72) Inventors: Jae Hyuk Huh, Suwon-si (KR); Jae Hyun Baik, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/407,606

(22) Filed: Jan. 9, 2024

(65) Prior Publication Data

US 2024/0151944 A1    May 9, 2024

Related U.S. Application Data

(63) Continuation of application No. 17/480,643, filed on Sep. 21, 2021, now Pat. No. 11,906,706, which is a
(Continued)

(30) Foreign Application Priority Data

Oct. 31, 2017    (KR) .......................... 10-2017-0143075

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .............................. G02B 9/64; G02B 13/0045
(Continued)

(56) References Cited

U.S. PATENT DOCUMENTS

| 3,958,864 A | 5/1976 | Glatzel |
| 4,013,350 A | 3/1977 | Ogawa |
(Continued)

FOREIGN PATENT DOCUMENTS

| CA | 2184883 A1 | 3/1997 |
| CN | 1152717 A | 6/1997 |
(Continued)

OTHER PUBLICATIONS

Korean Office Action issued on Oct. 19, 2018, in counterpart Korean Patent Application No. 10-2017-0143075 (5 pages in English, 4 pages in Korean).
(Continued)

*Primary Examiner* — Zachary W Wilkes
(74) *Attorney, Agent, or Firm* — NSIP Law

(57) ABSTRACT

An optical imaging system includes a first lens having an object-side surface that is convex; a second lens having a refractive power and a refractive index of 1.65 or more; a third lens having a refractive power; a fourth lens having a refractive power and an object-side surface that is convex; a fifth lens having a refractive power; a sixth lens having a positive refractive power; and a seventh lens having an object-side surface that is convex, wherein the first lens through the seventh lens are sequentially disposed in numerical order from an object side of the optical imaging system toward an imaging plane of the optical imaging system, and two or more of the first lens and the third lens through the seventh lens have a refractive index of 1.6 or more.

14 Claims, 7 Drawing Sheets

Related U.S. Application Data continuation of application No. 16/113,283, filed on Aug. 27, 2018, now Pat. No. 11,150,444.

(58) Field of Classification Search
USPC .................................................. 359/755, 708
See application file for complete search history.

(56) References Cited

U.S. PATENT DOCUMENTS

| | | | |
|---|---|---|---|
| 4,514,052 A | 4/1985 | Yamaguchi | |
| 4,747,676 A | 5/1988 | Hirakawa | |
| 4,976,525 A | 12/1990 | Matsumura et al. | |
| 5,253,112 A | 10/1993 | Suzuki et al. | |
| 5,796,529 A | 8/1998 | Park | |
| 8,599,495 B1* | 12/2013 | Tsai | H04N 23/55 |
| | | | 359/755 |
| 8,767,315 B2* | 7/2014 | Tsai | G02B 13/0045 |
| | | | 359/755 |
| 9,116,329 B2* | 8/2015 | Fukaya | G02B 13/0045 |
| 9,366,845 B2* | 6/2016 | Huang | G02B 27/0025 |
| 9,366,847 B2 | 6/2016 | Chen | |
| 9,423,595 B2* | 8/2016 | Shinohara | G02B 13/0045 |
| 9,442,277 B1* | 9/2016 | Shih | G02B 13/06 |
| 9,791,673 B2 | 10/2017 | Tang et al. | |
| 9,874,718 B2 | 1/2018 | Lee | |
| 10,139,598 B1* | 11/2018 | Wang | G02B 9/64 |
| 10,175,457 B2 | 1/2019 | Jhang et al. | |
| 10,228,541 B1 | 3/2019 | Shi et al. | |
| 10,234,657 B1* | 3/2019 | Shi | G02B 9/64 |
| 10,247,916 B2* | 4/2019 | Baik | G02B 1/041 |
| 10,310,227 B2* | 6/2019 | Hsu | G02B 13/0045 |
| 10,317,645 B2* | 6/2019 | Park | G02B 13/0045 |
| 10,330,895 B2 | 6/2019 | Shi et al. | |
| 10,359,606 B2 | 7/2019 | Chang et al. | |
| 10,365,460 B2 | 7/2019 | Yang | |
| 10,429,611 B2 | 10/2019 | Hsu et al. | |
| 10,429,621 B2 | 10/2019 | Jhang et al. | |
| 10,444,471 B2* | 10/2019 | Tseng | G02B 13/0045 |
| 10,459,201 B2 | 10/2019 | Chen et al. | |
| 10,514,527 B2 | 12/2019 | Wang et al. | |
| 10,571,661 B2 | 2/2020 | Huang | |
| 10,670,837 B2 | 6/2020 | Kuo | |
| 10,690,886 B2 | 6/2020 | Tang et al. | |
| 10,838,173 B2 | 11/2020 | Hsueh et al. | |
| 10,838,176 B2 | 11/2020 | Baik et al. | |
| 10,942,334 B2 | 3/2021 | Xu et al. | |
| 11,029,501 B2* | 6/2021 | Gao | G02B 9/64 |
| 11,150,444 B2* | 10/2021 | Huh | G02B 13/0045 |
| 2007/0188884 A1 | 8/2007 | Yoshitsugu et al. | |
| 2007/0206295 A1 | 9/2007 | Yamashita et al. | |
| 2009/0052057 A1 | 2/2009 | Lin | |
| 2014/0009843 A1* | 1/2014 | Tsai | G02B 9/64 |
| | | | 359/708 |
| 2014/0139719 A1* | 5/2014 | Fukaya | G02B 27/0025 |
| | | | 348/340 |
| 2015/0009578 A1* | 1/2015 | Shinohara | G02B 9/64 |
| | | | 359/708 |
| 2015/0070783 A1 | 3/2015 | Hashimoto | |
| 2015/0212298 A1* | 7/2015 | Shinohara | G02B 13/0045 |
| | | | 359/708 |
| 2015/0277083 A1 | 10/2015 | Chae | |
| 2015/0378131 A1 | 12/2015 | Tang et al. | |
| 2016/0033742 A1* | 2/2016 | Huang | G02B 13/0045 |
| | | | 359/708 |
| 2016/0109687 A1 | 4/2016 | Son | |
| 2016/0124191 A1 | 5/2016 | Hashimoto | |
| 2016/0223790 A1 | 8/2016 | Liao et al. | |
| 2016/0241756 A1 | 8/2016 | Chen | |
| 2017/0168268 A1 | 6/2017 | Tang et al. | |
| 2017/0184819 A1 | 6/2017 | Shi | |
| 2017/0219798 A1 | 8/2017 | Park | |
| 2017/0227734 A1* | 8/2017 | Huang | G02B 9/64 |
| 2017/0227744 A1 | 8/2017 | Sakata | |
| 2017/0357081 A1* | 12/2017 | Dai | G02B 9/64 |
| 2018/0149835 A1* | 5/2018 | Park | G02B 13/0045 |
| 2018/0180855 A1* | 6/2018 | Baik | G02B 13/0045 |
| 2018/0188482 A1 | 7/2018 | Jhang et al. | |
| 2018/0188485 A1 | 7/2018 | Fan et al. | |
| 2018/0188486 A1 | 7/2018 | Gong et al. | |
| 2018/0188488 A1 | 7/2018 | Gong et al. | |
| 2018/0239115 A1* | 8/2018 | Hsu | G02B 13/0045 |
| 2018/0335608 A1 | 11/2018 | Chang et al. | |
| 2019/0004285 A1 | 1/2019 | Tang et al. | |
| 2019/0025549 A1 | 1/2019 | Hsueh et al. | |
| 2019/0025551 A1* | 1/2019 | Kuo | G02B 13/0045 |
| 2019/0056568 A1 | 2/2019 | Huang | |
| 2019/0079270 A1* | 3/2019 | Tseng | G02B 13/18 |
| 2019/0094494 A1 | 3/2019 | Hsu et al. | |
| 2019/0121072 A1 | 4/2019 | Zhao et al. | |
| 2019/0146184 A1 | 5/2019 | Xu et al. | |
| 2019/0170987 A1* | 6/2019 | Gao | G02B 9/64 |
| 2019/0243107 A1* | 8/2019 | Hsu | G02B 13/0045 |
| 2020/0150401 A1 | 5/2020 | Huang | |
| 2020/0301105 A1 | 9/2020 | Jung et al. | |

FOREIGN PATENT DOCUMENTS

| | | | | |
|---|---|---|---|---|
| CN | 101021610 A | | 8/2007 | |
| CN | 101029958 A | | 9/2007 | |
| CN | 101373261 A | | 2/2009 | |
| CN | 202886720 U | | 4/2013 | |
| CN | 103529539 A | | 1/2014 | |
| CN | 203941337 U | | 11/2014 | |
| CN | 203965708 U | | 11/2014 | |
| CN | 204359999 U | | 5/2015 | |
| CN | 105301746 A | | 2/2016 | |
| CN | 105676422 A | | 6/2016 | |
| CN | 106855654 A | | 6/2017 | |
| CN | 106896478 A | | 6/2017 | |
| CN | 106908932 A | | 6/2017 | |
| CN | 107015343 A | | 8/2017 | |
| CN | 107037572 A | | 8/2017 | |
| CN | 107037573 A | | 8/2017 | |
| CN | 107422465 A | * | 12/2017 | ......... G02B 13/0045 |
| CN | 108254904 A | * | 7/2018 | ......... G02B 13/0045 |
| JP | 61-144617 A | | 7/1986 | |
| JP | 5-142473 A | | 6/1993 | |
| JP | 7-318803 A | | 12/1995 | |
| JP | 2714687 B2 | | 2/1998 | |
| JP | 2003-215445 A | | 7/2003 | |
| JP | 2013-217952 A | | 10/2013 | |
| JP | 2014-81485 A | | 5/2014 | |
| JP | 2015-72403 A | | 4/2015 | |
| JP | 2017-116911 A | | 6/2017 | |
| TW | 201606345 A | | 2/2016 | |
| TW | 201732360 A | | 9/2017 | |
| TW | 201732361 A | | 9/2017 | |

OTHER PUBLICATIONS

Taiwanese Office Action issued on Jan. 28, 2019, in counterpart Taiwanese Patent Application No. 107130758 (6 pages in English, 6 pages in Chinese).

Chinese Office Action issued on Sep. 11, 2020, in counterpart Chinese Patent Application No. 201811284050.1 (15 pages in English, 13 pages in Chinese).

Chinese Office Action issued on Feb. 20, 2021, in counterpart Chinese Patent Application No. 201811284050.1 (5 pages in English, 6 pages in Chinese).

Chinese Office Action issued on May 23, 2022, in counterpart Chinese Patent Application No. 202111114457.1 (5 pages in English and 7 pages in Chinese).

* cited by examiner

OPTICAL IMAGING SYSTEM

CROSS-REFERENCE TO RELATED APPLICATIONS

This application is a Continuation Application of U.S. patent application Ser. No. 17/480,643, filed on Sep. 21, 2021, now U.S. Pat. No. 11,906,706 issued on Feb. 20, 2024, which is a continuation of application Ser. No. 16/113,283 filed on Aug. 27, 2018, now U.S. Pat. No. 11,150,444, issued on Oct. 19, 2021, and claims the benefit under 35 USC 119 (a) of Korean Patent Application No. 10-2017-0143075 filed on Oct. 31, 2017, in the Korean Intellectual Property Office, the entire disclosures of which are incorporated herein by reference for all purposes.

BACKGROUND

1. Field

This application relates to an optical imaging system including seven lenses.

2. Description of Related Art

Small camera modules are mounted in many wireless terminals. For example, one small camera may be mounted facing a front surface of a wireless terminal, and another small camera module may be mounted facing a rear surface of the wireless terminal. Since the small camera module is used for a variety of applications such as capturing an outdoor image of a landscape and capturing an indoor image of a person, it is desirable that the performance of the small camera module be similar to the performance of a regular camera. However, the size of the small camera module is limited by the size of a mounting space available in the wireless terminal, making it difficult to implement a small camera module having a high performance

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having an object-side surface that is convex; a second lens having a refractive power and a refractive index of 1.65 or more; a third lens having a refractive power; a fourth lens having a refractive power and an object-side surface that is convex; a fifth lens having a refractive power; a sixth lens having a positive refractive power; and a seventh lens having an object-side surface that is convex, wherein the first lens through the seventh lens are sequentially disposed in numerical order from an object side of the optical imaging system toward an imaging plane of the optical imaging system, and two or more of the first lens and the third lens through the seventh lens have a refractive index of 1.6 or more.

The first lens may have a positive refractive power.
The second lens may have a negative refractive power.
At least three of the third lens through the sixth lens may have a positive refractive power.

The seventh lens may have a negative refractive power.
An object-side surface of the second lens may be convex.
An object-side surface of the third lens may be convex.
An image-side surface of the fifth lens may be convex.
An object-side surface of the sixth lens may be convex.

There may be an inflection point on either one or both of an object-side surface of the sixth lens and an image-side surface of the sixth lens.

There may be an inflection point on either one or both of the object-side surface of the seventh lens and an image-side surface of the seventh lens.

In another general aspect, an optical imaging system includes a first lens having a positive refractive power; a second lens having a refractive power and a refractive index of 1.6 or more; a third lens having a refractive power; a fourth lens having a refractive power; a fifth lens having a refractive power and a refractive index of 1.6 or more; a sixth lens having a refractive power and a refractive index of 1.6 or more; and a seventh lens having a refractive power, wherein the first lens through the seventh lens are sequentially disposed in numerical order from an object side of the optical imaging system toward an imaging plane of the optical imaging system, and an f-number (F No.) of the optical imaging system is less than 1.7.

The optical imaging system may satisfy the conditional expression $-1.0<(R11+R12)/(R11-R12)<1.0$, where R11 is a radius of curvature of an object-side surface of the sixth lens, and R12 is a radius of curvature of an image-side surface of the sixth lens.

The optical imaging system may satisfy the conditional expression $-1.0<(R9-R10)/(R9+R10)<1.0$, where R9 is a radius of curvature of an object-side surface of the fifth lens, and R10 is a radius of curvature of an image-side surface of the fifth lens.

The optical imaging system may satisfy the conditional expression $35<V1-V2$, where V1 is an Abbe number of the first lens, and V2 is an Abbe number of the second lens.

The optical imaging system may satisfy the conditional expression $-31<V3-V4$, where V3 is an Abbe number of the third lens, and V4 is an Abbe number of the fourth lens.

The optical imaging system may satisfy the conditional expression $1.5<Th1/Sag1$, where Th1 is a center thickness of the first lens, and Sag1 is a center thickness of an object-side surface of the first lens.

In another general aspect, an optical imaging system includes a first lens having a refractive power; a second lens having a refractive power; a third lens having a refractive power; a fourth lens having a refractive power; a fifth lens having a refractive power; a sixth lens having a refractive power; and a seventh lens having a refractive power, wherein the first lens through the seventh lens are sequentially disposed in numerical order from an object side of the optical imaging system toward an imaging plane of the optical imaging system, the refractive powers of four lenses among the first lens, the second lens, and the fourth lens through the seventh lens have a same sign that is opposite to a sign of the refractive powers of two remaining lenses among the first lens, the second lens, and the fourth lens through the seventh lens, and an f-number (F No.) of the optical imaging system is less than 1.7.

The refractive power of the third lens may be a positive refractive power or a negative refractive power.

A sign of a radius of curvature of an object side-surface of each of six lenses among the first lens through the seventh lens may be opposite to a sign of a radius of curvature of an object-side surface of one remaining lens among the first lens through the seventh lens.

A sign of a radius of curvature of an image-side surface of each of five lenses among the first lens through the seventh lens may be opposite to a sign of a radius of curvature of an image-side surface of each of two remaining lenses among the first lens through the seventh lens.

In another general aspect, an optical imaging system includes a first lens having a refractive power; a second lens having a refractive power and a refractive index of more than 1.6; a third lens having a refractive power; a fourth lens having a refractive power; a fifth lens having a refractive power; a sixth lens having a refractive power and a refractive index of 1.6 or more but less than the refractive index of the second lens; and a seventh lens having a refractive power, wherein the first lens through the seventh lens are sequentially disposed in numerical order from an object side of the optical imaging system toward an imaging plane of the optical imaging system.

A radius of curvature of an object-side surface of the fifth lens, a radius of curvature of an image-side surface of the fifth lens, a radius of curvature of an object-side surface of the sixth lens, and a radius of curvature of an image-side surface of the sixth lens may have a same magnitude.

A radius of curvature of an object-side surface of the fifth lens and a radius of curvature of an object-side surface of the sixth lens may have opposite signs, and a radius of curvature of an image-side surface of the fifth lens and a radius of curvature of an image-side surface of the sixth lens may have a same sign.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
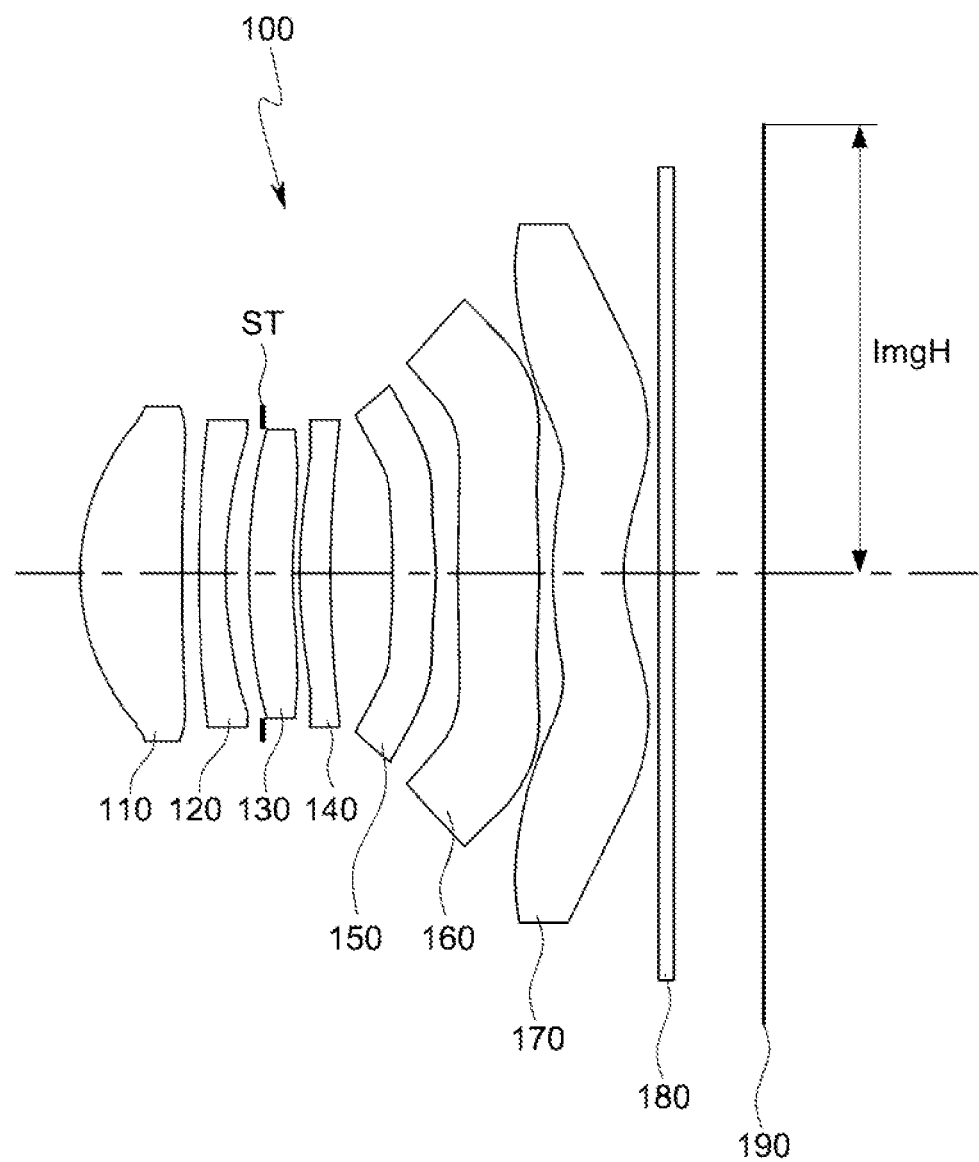
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In this application, a first lens is a lens closest to an object (or a subject), while a seventh lens is a lens closest to an imaging plane (or an image sensor). Further, radii of curvature and thicknesses of lenses, a TTL (a distance from an object-side surface of the first lens to the imaging plane), an ImgH (a half of a diagonal length of the imaging plane), and focal lengths of the lenses are expressed in millimeters (mm).

Further, the thicknesses of the lenses, gaps between the lenses, and the TTL are distances measured along optical axes of the lenses. Further, in a description of the shapes of the lenses, a statement that a surface of a lens is convex means that at least a paraxial region of the surface is convex, and a statement that a surface of a lens is concave means that at least a paraxial region of the surface is concave. A paraxial region of a lens surface is a central portion of the lens surface surrounding the optical axis of the lens in which light rays incident to the lens surface make a small angle θ to the optical axis and the approximations sin θ≈θ, tan θ≈θ, and cos θ≈1 are valid. Therefore, although it may be stated that a surface of a lens is convex, an edge portion of the surface may be concave. Likewise, although it may be stated that a surface of a lens is concave, an edge portion of the surface may be convex.

In the examples described in this application, an optical imaging system includes seven lenses. For example, the optical imaging system may include a first lens, a second lens, a third lens, a fourth lens, a fifth lens, a sixth lens, and a seventh lens sequentially disposed in numerical order from an object side of the optical imaging system toward an imaging plane of the optical imaging system. The first lens through the seventh lens may be disposed so that there is a first air gap between the first lens and the second lens, a second air gap between the second lens and the third lens, a third air gap between the third lens and the fourth lens, a fourth air gap between the fourth lens and the fifth lens, a fifth air gap between the fifth lens and the sixth lens, and a sixth air gap between the sixth lens and the seventh lens. Thus, an image-side surface of one lens may not be in contact with an object-side surface of a next lens closer to the imaging plane.

The first lens may have a refractive power. For example, the first lens may have a positive refractive power. One surface of the first lens may be convex. For example, an object-side surface of the first lens may be convex.

The first lens may have an aspherical surface. For example, both surfaces of the first lens may be aspherical. The first lens may be made of a material having a high light transmissivity and an excellent workability. For example, the first lens may be made of plastic. The first lens may have a small refractive index. For example, the refractive index of the first lens may be less than 1.6.

The second lens may have a refractive power. For example, the second lens may have a negative refractive power. One surface of the second lens may be convex. For example, an object-side surface of the second lens may be convex.

The second lens may have an aspherical surface. For example, an object-side surface of the second lens may be aspherical. The second lens may be made of a material having a high light transmissivity and an excellent workability. For example, the second lens may be made of plastic. The second lens may have a refractive index greater than the refractive index of the first lens. For example, the refractive index of the second lens may be 1.65 or more.

The third lens may have a refractive power. For example, the third lens may have a positive refractive power or a negative refractive power. One surface of the third lens may be convex. For example, an object-side surface of the third lens may be convex.

The third lens may have an aspherical surface. For example, an image-side surface of the third lens may be aspherical. The third lens may be made of a material having a high light transmissivity and an excellent workability. For example, the third lens may be made of plastic. The third lens may have a refractive index that is substantially equal to the refractive index of the first lens. For example, the refractive index of the third lens may be less than 1.6.

The fourth lens may have a refractive power. For example, the fourth lens may have a positive refractive power. One surface of the fourth lens may be convex. For example, an object-side surface of the fourth lens may be convex.

The fourth lens may have an aspherical surface. For example, both surfaces of the fourth lens may be aspherical. The fourth lens may be made of a material having a high light transmissivity and an excellent workability. For example, the fourth lens may be made of plastic. The fourth lens may have a refractive index that is substantially equal to the refractive index of the first lens. For example, the refractive index of the fourth lens may be less than 1.6.

The fifth lens may have a refractive power. For example, the fifth lens may have a positive refractive power. One surface of the fifth lens may be convex. For example, an image-side surface of the fifth lens may be convex.

The fifth lens may have an aspherical surface. For example, both surfaces of the fifth lens may be aspherical. The fifth lens may be made of a material having a high light transmissivity and an excellent workability. For example, the fifth lens may be made of plastic. The fifth lens may have a refractive index greater than the refractive index of the fourth lens. For example, the refractive index of the fifth lens may be 1.6 or more.

The sixth lens may have a refractive power. For example, the sixth lens may have a positive refractive power. One surface of the sixth lens may be convex. For example, an image-side surface of the sixth lens may be convex. The sixth lens may have inflection points. For example, there may be an inflection point on either one or both of an object-side surface of the sixth lens and the image-side surface of the sixth lens.

The sixth lens may have an aspherical surface. For example, both surfaces of the sixth lens may be aspherical. The sixth lens may be made of a material having a high light transmissivity and an excellent workability. For example, the sixth lens may be made of plastic. The sixth lens may have a refractive index that is substantially equal to the refractive index of the fifth lens. For example, the refractive index of the sixth lens may be 1.6 or more.

The seventh lens may have a refractive power. For example, the seventh lens may have a negative refractive power. One surface of the seventh lens may be convex. For example, an object-side surface of the seventh lens may be convex. The seventh lens may have inflection points. For example, there may be one or more inflection points on both surfaces of the seventh lens.

The seventh lens may have an aspherical surface. For example, both surfaces of the seventh lens may be aspherical. The seventh lens may be made of a material having a high light transmissivity and an excellent workability. For example, the seventh lens may be made of plastic. The seventh lens may have a refractive index smaller than the refractive index of the sixth lens. For example, the refractive index of the seventh lens may be less than 1.6.

The aspherical surfaces of the first lens through the seventh lens are represented by the Equation 1 below.

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + Hr^{18} + Jr^{20} \tag{1}$$

In Equation 1, c is an inverse of a radius of curvature of the lens, k is a conic constant, r is a distance from a certain point on an aspherical surface of the lens to an optical axis of the lens, A through J are aspherical constants, and Z (or (Sag) is a distance between the certain point on the aspherical surface of the lens at the distance r and a tangential plane meeting the apex of the aspherical surface of the lens.

The optical imaging system may further include a filter, an image sensor, and a stop.

The filter may be disposed between the seventh lens and the image sensor. The filter may block some wavelengths of light. For example, the filter may block infrared wavelengths of light.

The image sensor may form the imaging plane. For example, a surface of the image sensor may form the imaging plane.

The stop may be disposed to control an amount of light incident to the image sensor. For example, the stop may be disposed between the first lens and the second lens or between the second lens and the third lens, but is not limited to these positions.

The optical imaging system may satisfy one or more of Conditional Expressions 1 through 16 below.

$F$ No.$<1.7$ (Conditional Expression 1)

$TTL/ImgH<2.0$ (Conditional Expression 2)

$70<FOV$ (Conditional Expression 3)

$-1.0<(R11+R12)/(R11-R12)<1.0$ (Conditional Expression 4)

$-1.0<(R9-R10)/(R9+R10)<1.0$ (Conditional Expression 5)

$35<V1-V2$ (Conditional Expression 6)

$-31<V3-V4$ (Conditional Expression 7)

$1.5<Th1/Sag1$ (Conditional Expression 8)

$55<V7$ (Conditional Expression 9)

$1.66 \leq Nd2$ (Conditional Expression 10)

$1.65 \leq Nd5$ (Conditional Expression 11)

$1.61 \leq Nd6$ (Conditional Expression 12)

$1.60<(Nd2+Nd5+Nd6)/3<1.66$ (Conditional Expression 13)

$1.59<(Nd2+Nd3+Nd4+Nd5+Nd6)/5<1.61$ (Conditional Expression 14)

$50<|f5/f|$ (Conditional Expression 15)

$50<|f6/f|$ (Conditional Expression 16)

In the above Conditional Expressions 1 through 16, TTL is a distance from the object-side surface of the first lens to the imaging plane, f is an overall focal length of the optical imaging system, ImgH is a half of a diagonal length of the imaging plane, FOV is a field of view of the optical imaging system, R9 is a radius of curvature of an object-side surface of the fifth lens, R10 is a radius of curvature of the image-side surface of the fifth lens, R11 is a radius of curvature of the object-side surface of the sixth lens, R12 is a radius of curvature of the image-side surface of the sixth lens, V1 is an Abbe number of the first lens, V2 is an Abbe number of the second lens, V3 is an Abbe number of the third lens, V4 is an Abbe number of the fourth lens, V7 is an Abbe number of the seventh lens, Th1 is a center thickness of the first lens, Sag1 is a center thickness of the object-side surface of the first lens, Nd2 is a refractive index of the second lens, Nd5 is a refractive index of the fifth lens, Nd6 is a refractive index of the sixth lens, f5 is a focal length of the fifth lens, and f6 is a focal length of the sixth lens.

Next, several examples of an optical imaging system will be described.

FIG. 1 is a view illustrating a first example of an optical imaging system.

Referring to FIG. 1, an optical imaging system 100 includes a first lens 110, a second lens 120, a third lens 130, a fourth lens 140, a fifth lens 150, a sixth lens 160, and a seventh lens 170.

The first lens 110 has a positive refractive power, and an object-side surface thereof is convex and an image-side surface thereof is concave. The second lens 120 has a negative refractive power, and an object-side surface thereof is convex and an image-side surface thereof is concave. The third lens 130 has a positive refractive power, and an object-side surface thereof is convex and an image-side surface thereof is concave. The fourth lens 140 has a positive refractive power, and an object-side surface thereof is convex and an image-side surface thereof is concave. The fifth lens 150 has a positive refractive power, and an object-side surface thereof is concave and an image-side surface thereof is convex. The sixth lens 160 has a positive refractive power, and an object-side surface thereof is convex and an image-side surface thereof is convex. There is an inflection point on either one or both of the object-side surface of the sixth lens 160 and the image-side surface of the sixth lens 160. The seventh lens 170 has a negative refractive power, and an object-side surface thereof is convex and an image-side surface thereof is concave. There is inflection point on either one or both of the object-side surface of the seventh lens 170 and the image-side surface of the seventh lens 170.

The optical imaging system 100 further includes a filter 180, an image sensor 190, and a stop ST. The filter 180 is disposed between the seventh lens 170 and the image sensor 190, and the stop ST is disposed between the second lens 120 and the third lens 130, but the stop ST is not limited to this position.

The optical imaging system 100 includes a plurality of lenses having a high refractive index. For example, the second lens 120, the fifth lens 150, and the sixth lens 160 have a refractive index of 1.6 or more. In detail, the second lens 120 and the fifth lens 150 have a refractive index greater than 1.65 and smaller than 1.75, and the sixth lens 160 has a refractive index greater than 1.64 and smaller than 1.75.

The optical imaging system 100 is configured to implement a bright optical system. For example, an f-number (hereinafter F No.) of the optical imaging system 100 is less than 1.6. In detail, the F No. of the optical imaging system 100 is 1.570. The optical imaging system 100 has a wide field of view. For example, the optical imaging system 100 has a field of view of 70° or more. In detail, the field of view of the optical imaging system 100 is 76.72°.

In the optical imaging system 100, the fifth lens 150 and the sixth lens 160 have focal lengths that are substantially longer than the focal lengths of the first lens 110, the second lens 120, the third lens 130, the fourth lens 140, and the seventh lens 170. In detail, an absolute value of the focal length of the fifth lens 150 and an absolute value of the focal length of the sixth lens 160 are 50 or more.

Figure 2:
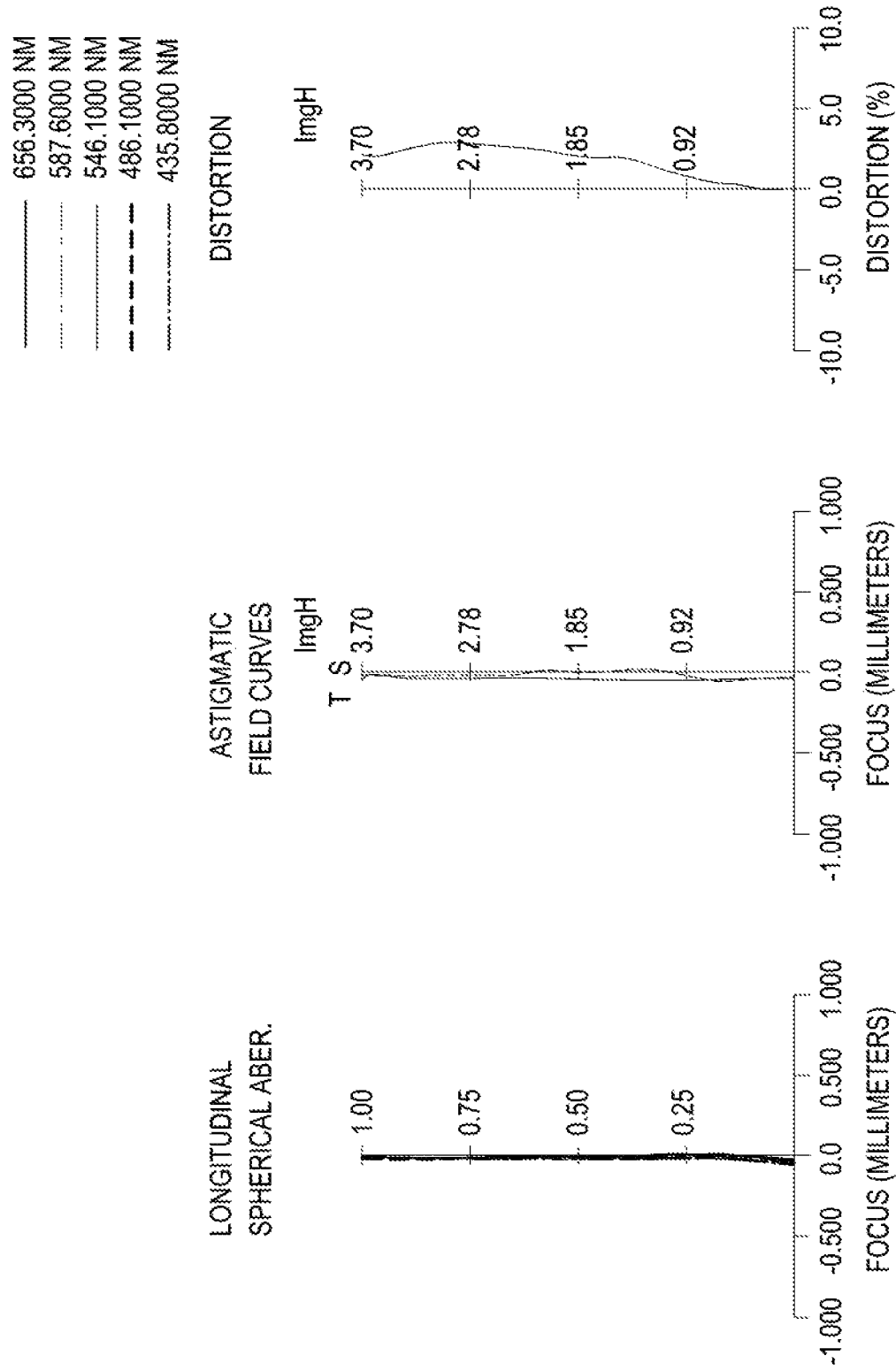
FIG. 2 illustrates curves representing aberration characteristics of the optical imaging system illustrated in FIG. 1.

FIG. 2 illustrates curves representing aberration characteristics of the optical imaging system illustrated in FIG. 1.

Table 1 below lists characteristics of the optical imaging system illustrated in FIG. 1, and Table 2 below lists aspherical values of the lenses of the optical imaging system illustrated in FIG. 1.

The first lens 210 has a positive refractive power, and an object-side surface thereof is convex and an image-side surface thereof is concave. The second lens 220 has a negative refractive power, and an object-side surface thereof

TABLE 1

First Example f = 4.30   F No. = 1.570   FOV = 76.72°   TTL = 5.1850

| Surface No. | Element | Radius of Curvature | Thickness/ Distance | Refractive Index | Abbe No. | Focal Length |
|---|---|---|---|---|---|---|
| S1 | First Lens | 1.8301 | 0.7720 | 1.544 | 56.1 | 4.470 |
| S2 |  | 6.2991 | 0.1447 |  |  |  |
| S3 | Second Lens | 8.2729 | 0.2000 | 1.661 | 20.4 | −9.660 |
| S4 |  | 3.5691 | 0.1696 |  |  |  |
| S5 | Third Lens | 3.7311 | 0.3337 | 1.544 | 56.1 | 173.727 |
| S6 |  | 3.7620 | 0.0470 |  |  |  |
| S7 | Fourth Lens | 2.6622 | 0.2300 | 1.544 | 56.1 | 9.811 |
| S8 |  | 5.1500 | 0.4686 |  |  |  |
| S9 | Fifth Lens | −1000.0000 | 0.3109 | 1.661 | 20.4 | 12226873.6 |
| S10 |  | −1000.0000 | 0.1970 |  |  |  |
| S11 | Sixth Lens | 1000.0000 | 0.5668 | 1.639 | 23.5 | 782.559 |
| S12 |  | −1000.0000 | 0.1428 |  |  |  |
| S13* | Seventh Lens | 1.6880 | 0.5353 | 1.534 | 55.7 | −11.283 |
| S14* |  | 1.1730 | 0.2666 |  |  |  |
| S15 | Filter | Infinity | 0.1100 | 1.518 | 64.2 |  |
| S16 |  | Infinity | 0.6800 |  |  |  |
| S17 | Imaging Plane | Infinity | 0.0100 |  |  |  |

TABLE 2

| First Example | Radius of Curvature | K | A | B | C | D |
|---|---|---|---|---|---|---|
| S1 | 1.83009 | −1.655222 | 0.011609 | 0.096539 | −0.315556 | 0.610396 |
| S2 | 6.299106 | −24.0002 | −0.012948 | −0.036302 | 0.041468 | −0.04313 |
| S3 | 8.272929 | −50.68706 | −0.038972 | −0.03102 | −0.000213 | 0.220359 |
| S4 | 3.569096 | 4.824163 | −0.043413 | −0.063398 | 0.151342 | −0.382743 |
| S5 | 3.731059 | −12.7995 | −0.00828 | 0.161583 | −0.939269 | 2.416569 |
| S6 | 3.761995 | −42.89157 | −0.108149 | 0.316959 | −0.851392 | 1.290971 |
| S7 | 2.662169 | −0.353072 | −0.237 | 0.581492 | −1.662903 | 3.443945 |
| S8 | 5.149962 | −4.249512 | −0.024748 | −0.041712 | 0.311063 | −1.013056 |
| S9 | −1000 | 0 | 0.083007 | −0.811293 | 2.302141 | −4.183661 |
| S10 | −1000 | 0 | 0.262719 | −1.138775 | 2.072394 | −2.444414 |
| S11 | 1000 | 0 | 0.462519 | −1.11169 | 1.591279 | −1.606127 |
| S12 | −1000 | 0 | 0.146437 | −0.169895 | 0.11175 | −0.063456 |
| S13 | 1.688049 | −10.8245 | −0.200573 | 0.052657 | 0.010219 | −0.009036 |
| S14 | 1.173041 | −5.597324 | −0.136237 | 0.062663 | −0.025288 | 0.007501 |

| First Example | E | F | G | H | J |
|---|---|---|---|---|---|
| S1 | −0.740964 | 0.564371 | −0.262453 | 0.067739 | −0.007422 |
| S2 | 0.042757 | −0.036405 | 0.020942 | −0.006663 | 0.000857 |
| S3 | −0.442337 | 0.44756 | −0.255289 | 0.078531 | −0.010283 |
| S4 | 0.81761 | −1.050675 | 0.767496 | −0.288009 | 0.042208 |
| S5 | −3.961589 | 4.125234 | −2.589919 | 0.900393 | −0.134051 |
| S6 | −1.548573 | 1.59749 | −1.137569 | 0.453775 | −0.075482 |
| S7 | −5.296634 | 5.687939 | −3.833817 | 1.427254 | −0.222764 |
| S8 | 1.758942 | −1.809129 | 1.125806 | −0.397027 | 0.06137 |
| S9 | 5.04673 | −4.049427 | 2.072428 | −0.610492 | 0.078448 |
| S10 | 1.917647 | −0.990748 | 0.323498 | −0.060138 | 0.004812 |
| S11 | 1.085597 | −0.476892 | 0.129793 | −0.019728 | 0.001273 |
| S12 | 0.028711 | −0.009017 | 0.001779 | −0.000196 | 9.21E-06 |
| S13 | 0.002386 | −0.00033 | 2.41E-05 | −7.24E-07 | 0 |
| S14 | −0.001441 | 0.00017 | −1.12E-05 | 3.14E-07 | 0 |

Figure 3:
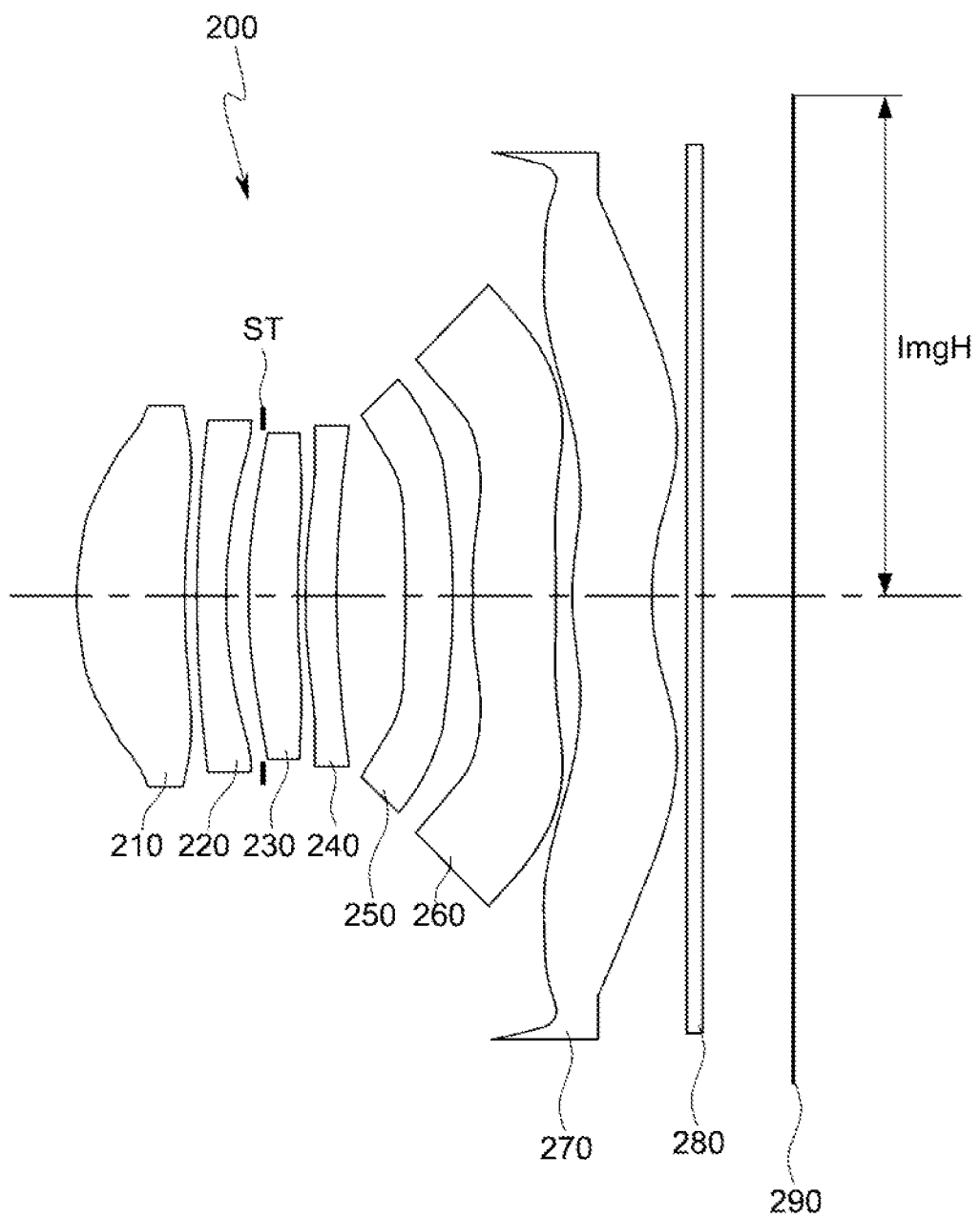
FIG. 3 is a view illustrating a second example of an optical imaging system.

FIG. 3 is a view illustrating a second example of an optical imaging system.

Referring to FIG. 3, an optical imaging system 200 includes a first lens 210, a second lens 220, a third lens 230, a fourth lens 240, a fifth lens 250, a sixth lens 260, and a seventh lens 270.

is convex and an image-side surface thereof is concave. The third lens 230 has a positive refractive power, and an object-side surface thereof is convex and an image-side surface thereof is concave. The fourth lens 240 has a positive refractive power, and an object-side surface thereof is convex and an image-side surface thereof is concave. The fifth lens 250 has a positive refractive power, and an object-side surface thereof is concave and an image-side surface thereof is convex. The sixth lens 260 has a positive refractive power, and an object-side surface thereof is convex and an image-side surface thereof is convex. There is an inflection point on either one or both of the object-side surface of the sixth lens 260 and the image-side surface of the sixth lens 260. The seventh lens 270 has a negative refractive power, and an object-side surface thereof is convex and an image-side surface thereof is concave. There is an inflection point on either one or both of the object-side surface of the seventh lens 270 and the image-side surface of the seventh lens 270.

The optical imaging system 200 further includes a filter 280, an image sensor 290, and a stop ST. The filter 280 is disposed between the seventh lens 270 and the image sensor 290, and the stop ST is disposed between the second lens 220 and the third lens 230, but the stop ST is not limited to this position.

The optical imaging system 200 includes a plurality of lenses having a high refractive index. For example, the second lens 220, the fifth lens 250, and the sixth lens 260 have a refractive index of 1.6 or more. In detail, the second lens 220 and the fifth lens 250 have a refractive index greater than 1.64 and smaller than 1.75, and the sixth lens 260 has a refractive index greater than 1.60 and smaller than 1.75.

The optical imaging system 200 is configured to implement a bright optical system. For example, an F No. of the optical imaging system 200 is less than 1.6. In detail, the F No. of the optical imaging system 200 is 1.570. The optical imaging system 200 has a wide field of view. For example, the optical imaging system 200 has a field of view of 70° or more. In detail, the field of view of the optical imaging system 200 is 76.50°.

In the optical imaging system 200, the fifth lens 250 and the sixth lens 260 have focal lengths that are substantially longer than the focal lengths of the first lens 210, the second lens 220, the third lens 230, the fourth lens 240, and the seventh lens 270. In detail, an absolute value of the focal length of the fifth lens 250 and an absolute value of the focal length of the sixth lens 260 are 50 or more.

Figure 4:
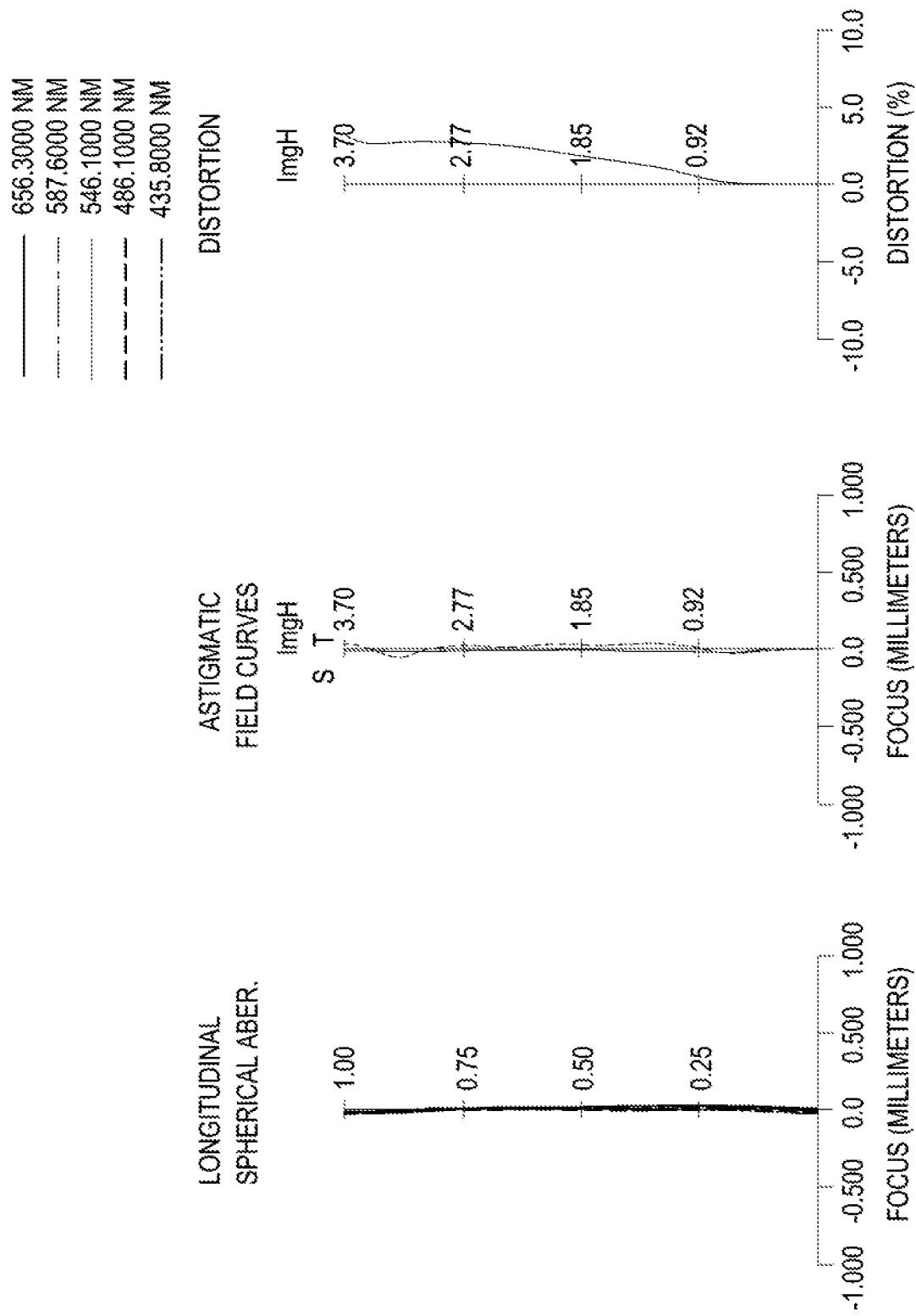
FIG. 4 illustrates curves representing aberration characteristics of the optical imaging system illustrated in FIG. 3.

FIG. 4 illustrates curves representing aberration characteristics of the optical imaging system illustrated in FIG. 3.

Table 3 below lists characteristics of the optical imaging system illustrated in FIG. 3, and Table 4 below lists aspherical values of the lenses of the optical imaging system illustrated in FIG. 3.

TABLE 3

Second Example f = 4.31    F No. = 1.570    FOV = 76.50°    TTL = 5.1662

| Surface No. | Element | Radius of Curvature | Thickness/ Distance | Refractive Index | Abbe No. | Focal Length |
|---|---|---|---|---|---|---|
| S1 | First Lens | 1.8308 | 0.7752 | 1.544 | 56.1 | 4.475 |
| S2 |  | 6.2824 | 0.0847 |  |  |  |
| S3 | Second Lens | 6.8610 | 0.2000 | 1.661 | 20.4 | −9.598 |
| S4 |  | 3.2580 | 0.1828 |  |  |  |
| S5 | Third Lens | 3.2915 | 0.3477 | 1.544 | 56.1 | 55.807 |
| S6 |  | 3.5544 | 0.0538 |  |  |  |
| S7 | Fourth Lens | 2.8234 | 0.2300 | 1.544 | 56.1 | 11.039 |
| S8 |  | 5.1757 | 0.4972 |  |  |  |
| S9 | Fifth Lens | −1000.0000 | 0.3274 | 1.650 | 21.5 | 11926835.3 |
| S10 |  | −1000.0000 | 0.1660 |  |  |  |
| S11 | Sixth Lens | 1000.0000 | 0.5800 | 1.614 | 26.0 | 814.422 |
| S12 |  | −1000.0000 | 0.1257 |  |  |  |
| S13* | Seventh Lens | 1.8210 | 0.5750 | 1.537 | 55.7 | −10.444 |
| S14* |  | 1.2228 | 0.2594 |  |  |  |
| S15 | Filter | Infinity | 0.1100 | 1.518 | 64.2 |  |
| S16 |  | Infinity | 0.6413 |  |  |  |
| S17 | Imaging Plane | Infinity | 0.0100 |  |  |  |

TABLE 4

| Second Example | Radius of Curvature | K | A | B | C | D |
|---|---|---|---|---|---|---|
| S1 | 1.83083 | −1.656393 | 0.017286 | 0.06116 | −0.19093 | 0.345018 |
| S2 | 6.282374 | −29.54929 | 0.024137 | −0.174885 | 0.227431 | −0.139938 |
| S3 | 6.860987 | −31.05765 | 0.028899 | −0.234535 | 0.236438 | 0.17765 |
| S4 | 3.258011 | 4.284644 | 0.004565 | −0.164421 | 0.036444 | 0.643432 |
| S5 | 3.291508 | −11.84234 | 0.012702 | 0.094191 | −0.790863 | 2.299555 |
| S6 | 3.55435 | −43.65426 | −0.081528 | 0.323955 | −1.288612 | 3.145509 |
| S7 | 2.823397 | −0.419739 | −0.222721 | 0.589436 | −1.97369 | 5.123113 |
| S8 | 5.175692 | −2.375567 | −0.029125 | −0.063734 | 0.428849 | −1.092617 |
| S9 | −1000 | 0 | 0.107094 | −1.122263 | 3.496403 | −6.752948 |
| S10 | −1000 | 0 | 0.397094 | −1.761236 | 3.408488 | −4.195721 |
| S11 | 1000 | 0 | 0.622941 | −1.600484 | 2.34266 | −2.37696 |
| S12 | −1000 | 0 | 0.220137 | −0.271915 | 0.168359 | −0.072229 |
| S13 | 1.821006 | −10.60837 | −0.197899 | 0.076795 | −0.012115 | 0.000193 |
| S14 | 1.222811 | −6.923557 | −0.101985 | 0.028965 | −0.004865 | 0.000308 |

TABLE 4-continued

| Second Example | E | F | G | H | J |
|---|---|---|---|---|---|
| S1 | −0.390544 | 0.275705 | −0.118328 | 0.027895 | −0.002749 |
| S2 | 0.013017 | 0.039269 | −0.027628 | 0.008236 | −0.000991 |
| S3 | −0.619936 | 0.643085 | −0.345564 | 0.097409 | −0.011484 |
| S4 | −1.604919 | 2.015491 | −1.468899 | 0.59189 | −0.101706 |
| S5 | −4.208722 | 4.813853 | −3.281922 | 1.228475 | −0.195048 |
| S6 | −5.875814 | 7.418034 | −5.59277 | 2.263791 | −0.37978 |
| S7 | −9.8812 | 12.42119 | −9.265008 | 3.709381 | −0.615001 |
| S8 | 1.408882 | −1.004316 | 0.403852 | −0.091228 | 0.01079 |
| S9 | 8.524675 | −7.071651 | 3.709114 | −1.114072 | 0.145665 |
| S10 | 3.398872 | −1.795981 | 0.593943 | −0.111108 | 0.008933 |
| S11 | 1.623419 | −0.723877 | 0.200749 | −0.031257 | 0.002079 |
| S12 | 0.023058 | −0.00544 | 0.000884 | −8.64E−05 | 3.75E−06 |
| S13 | 0.000245 | −4.22E−05 | 3.07E−06 | −8.71E−08 | 0 |
| S14 | 4.79E−05 | −1.03E−05 | 6.53E−07 | −1.28E−08 | 0 |

Figure 5:
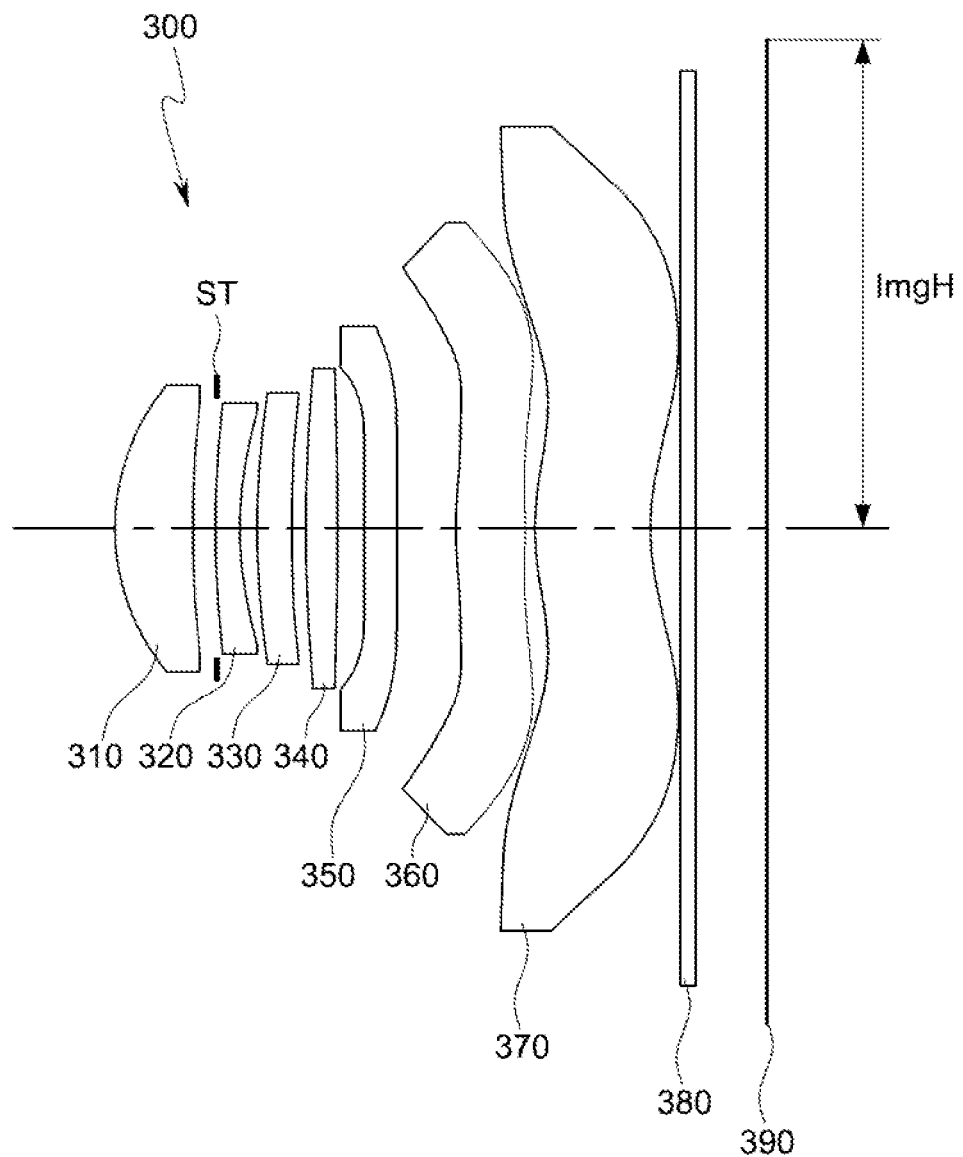
FIG. 5 is a view illustrating a third example of an optical imaging system.

FIG. 5 is a view illustrating a third example of an optical imaging system.

Referring to FIG. 5, an optical imaging system 300 includes a first lens 310, a second lens 320, a third lens 330, a fourth lens 340, a fifth lens 350, a sixth lens 360, and a seventh lens 370.

The first lens 310 has a positive refractive power, and an object-side surface thereof is convex and an image-side surface thereof is concave. The second lens 320 has a negative refractive power, and an object-side surface thereof is convex and an image-side surface thereof is concave. The third lens 330 has a negative refractive power, and an object-side surface thereof is convex and an image-side surface thereof is concave. The fourth lens 340 has a positive refractive power, and an object-side surface thereof is convex and an image-side surface thereof is concave. The fifth lens 350 has a positive refractive power, and an object-side surface thereof is concave and an image-side surface thereof is convex. The sixth lens 360 has a positive refractive power, and an object-side surface thereof is convex and an image-side surface thereof is convex. There is an inflection point on either one or both of the object-side surface of the sixth lens 360 and the image-side surface of the sixth lens 360. The seventh lens 370 has a negative refractive power, and an object-side surface thereof is convex and an image-side surface thereof is concave. There is an inflection point on either one or both of the object-side surface of the seventh lens 370 and the image-side surface of the seventh lens 370.

The optical imaging system 300 further include a filter 380, an image sensor 390, and a stop ST. The filter 380 is disposed between the seventh lens 370 and the image sensor 390, and the stop ST is disposed between the first lens 310 and the second lens 320, but the stop ST is not limited to this position.

The optical imaging system 300 includes a plurality of lenses having a high refractive index. For example, the second lens 320, the fifth lens 350, and the sixth lens 360 have a refractive index of 1.6 or more. In detail, the second lens 320 and the fifth lens 350 have a refractive index greater than 1.64 and smaller than 1.75, and the sixth lens 360 has a refractive index greater than 1.60 and smaller than 1.75.

The optical imaging system 300 is configured to implement a bright optical system. For example, an F No. of the optical imaging system 300 is less than 1.6. In detail, the F No. of the optical imaging system 300 is 1.550. The optical imaging system 300 has a wide field of view. For example, the optical imaging system 300 has a field of view of 70° or more. In detail, the field of view of the optical imaging system 300 is 76.46°.

In the optical imaging system 300, the fifth lens 350 and the sixth lens 360 have focal lengths that are substantially longer than the focal lengths of the first lens 310, the second lens 320, the third lens 330, the fourth lens 340, and the seventh lens 370. In detail, an absolute value of the focal length of the fifth lens 350 and an absolute value of the focal length of the sixth lens 360 are 50 or more.

Figure 6:
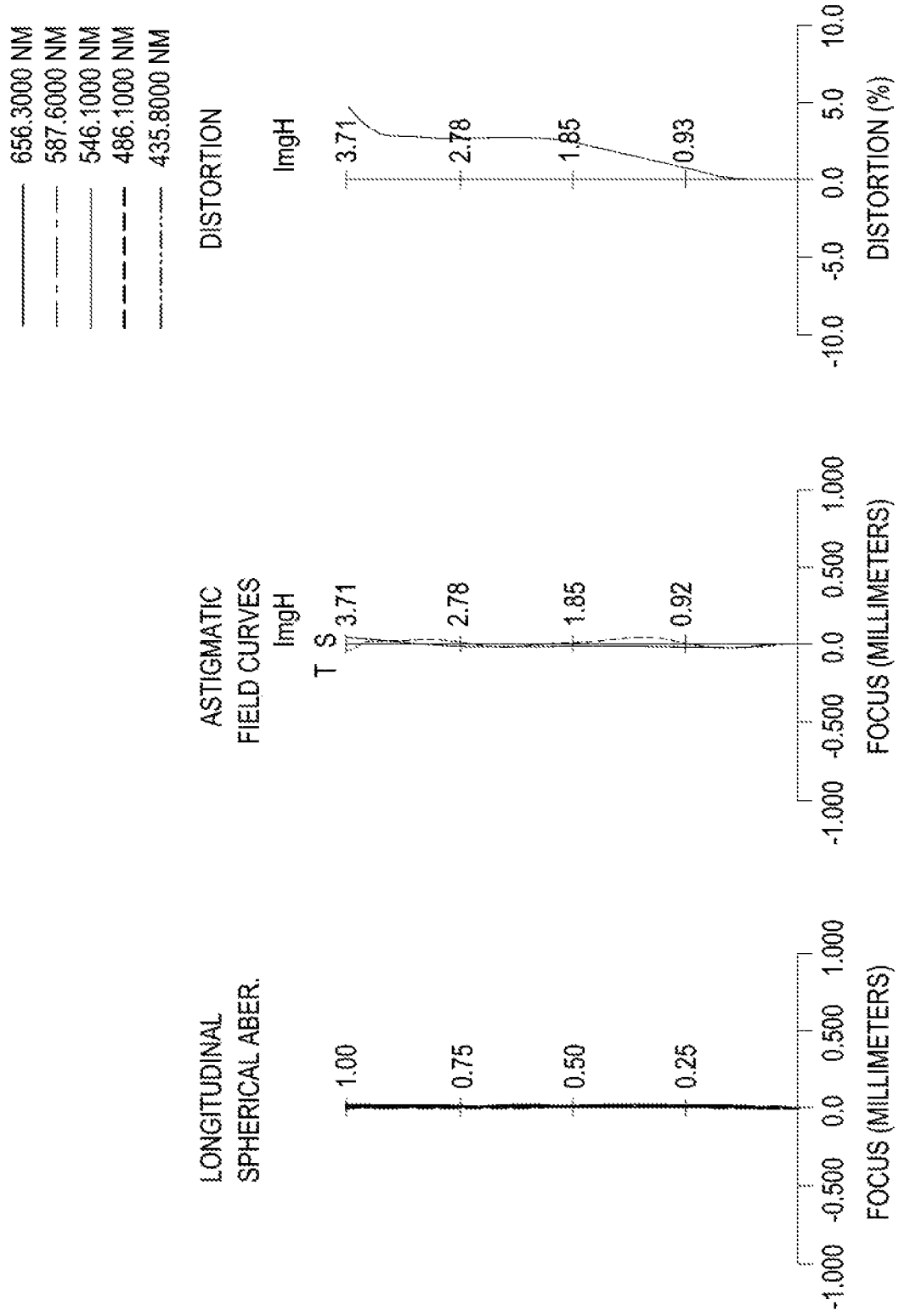
FIG. 6 illustrates curves representing aberration characteristics of the optical imaging system illustrated in FIG. 5.

FIG. 6 illustrates curves representing aberration characteristics of the optical imaging system illustrated in FIG. 5.

Table 5 below lists characteristics of the optical imaging system illustrated in FIG. 5, and Table 6 below lists aspherical values of the optical imaging system illustrated in FIG. 5.

TABLE 5

Third Example f = 4.29  F No. = 1.550  FOV = 76.46°  TTL = 5.1664

| Surface No. | Element | Radius of Curvature | Thickness/ Distance | Refractive Index | Abbe No. | Focal Length |
|---|---|---|---|---|---|---|
| S1 | First Lens | 1.8418 | 0.8794 | 1.544 | 56.1 | 3.999 |
| S2 |  | 9.9865 | 0.1265 |  |  |  |
| S3 | Second Lens | 13.5144 | 0.2000 | 1.661 | 20.4 | −6.959 |
| S4 |  | 3.4117 | 0.1824 |  |  |  |
| S5 | Third Lens | 3.7101 | 0.2912 | 1.544 | 56.1 | −223.645 |
| S6 |  | 3.5008 | 0.0890 |  |  |  |
| S7 | Fourth Lens | 2.6005 | 0.3175 | 1.544 | 56.1 | 7.552 |
| S8 |  | 6.7807 | 0.4601 |  |  |  |
| S9 | Fifth Lens | −1000.0000 | 0.2694 | 1.650 | 21.5 | 14493820.8 |
| S10 |  | −1000.0000 | 0.1755 |  |  |  |
| S11 | Sixth Lens | 1000.0000 | 0.5974 | 1.614 | 26.0 | 814.425 |

TABLE 5-continued

Third Example

| f = 4.29 | | F No. = 1.550 | | FOV = 76.46° | | TTL = 5.1664 |
|---|---|---|---|---|---|---|
| Surface No. | Element | Radius of Curvature | Thickness/ Distance | Refractive Index | Abbe No. | Focal Length |
| S12 | | −1000.0000 | 0.0763 | | | |
| S13* | Seventh Lens | 1.9095 | 0.5047 | 1.537 | 55.7 | −9.340 |
| S14* | | 1.2550 | 0.2356 | | | |
| S15 | Filter | Infinity | 0.1100 | 1.518 | 64.2 | |
| S16 | | Infinity | 0.6414 | | | |
| S17 | Imaging Plane | Infinity | 0.0100 | | | |

TABLE 6

| Third Example | Radius of Curvature | K | A | B | C | D |
|---|---|---|---|---|---|---|
| S1 | 1.841826 | −1.462086 | 0.012788 | 0.061325 | −0.172378 | 0.293949 |
| S2 | 9.9865 | −17.91134 | −0.014424 | −0.068103 | 0.144166 | −0.185501 |
| S3 | 13.51441 | −86.75103 | −0.038677 | −0.085675 | 0.224002 | −0.221528 |
| S4 | 3.411718 | 4.714184 | −0.039449 | −0.045848 | −0.031295 | 0.480893 |
| S5 | 3.710118 | −12.79496 | −0.002502 | 0.041109 | −0.08173 | −0.209726 |
| S6 | 3.500774 | −29.08782 | −0.120049 | 0.394419 | −1.126101 | 2.316988 |
| S7 | 2.600541 | −1.083666 | −0.219525 | 0.409073 | −1.013326 | 1.920992 |
| S8 | 6.780692 | −31.36657 | −0.02191 | −0.035227 | 0.00175 | 0.090905 |
| S9 | −1000 | 0 | 0.126159 | −0.931095 | 2.5332 | −4.487992 |
| S10 | −1000 | 0 | 0.36609 | −1.532914 | 2.854924 | −3.429848 |
| S11 | 1000 | 0 | 0.527122 | −1.377009 | 1.940405 | −1.926311 |
| S12 | −1000 | 0 | 0.242775 | −0.388155 | 0.307591 | −0.167471 |
| S13 | 1.909463 | −8.976906 | −0.216709 | 0.055501 | 0.022492 | −0.018664 |
| S14 | 1.255005 | −6.875364 | −0.132917 | 0.049273 | −0.009561 | 0.000608 |

| Third Example | E | F | G | H | J |
|---|---|---|---|---|---|
| S1 | −0.31746 | 0.216412 | −0.090331 | 0.020876 | −0.002045 |
| S2 | 0.172633 | −0.121329 | 0.058294 | −0.016259 | 0.001935 |
| S3 | 0.131918 | −0.067941 | 0.039089 | −0.015451 | 0.002457 |
| S4 | −1.188356 | 1.541756 | −1.167393 | 0.490465 | −0.087514 |
| S5 | 0.766239 | −1.085566 | 0.788633 | −0.272573 | 0.03356 |
| S6 | −3.526795 | 3.656188 | −2.420794 | 0.933238 | −0.159053 |
| S7 | −2.622662 | 2.393083 | −1.383999 | 0.46906 | −0.071624 |
| S8 | −0.208643 | 0.202887 | −0.090783 | 0.012402 | 0.002082 |
| S9 | 5.318798 | −4.223099 | 2.151266 | −0.636085 | 0.082886 |
| S10 | 2.735254 | −1.429525 | 0.467377 | −0.086044 | 0.006766 |
| S11 | 1.303889 | −0.577519 | 0.158715 | −0.024388 | 0.001594 |
| S12 | 0.065444 | −0.017793 | 0.003141 | −0.00032 | 1.42E−05 |
| S13 | 0.005574 | −0.00088 | 7.25E−05 | −2.45E−06 | 0 |
| S14 | 6.42E−05 | −5.61E−06 | −8.73E−07 | 8.05E−08 | 0 |

Figure 7:
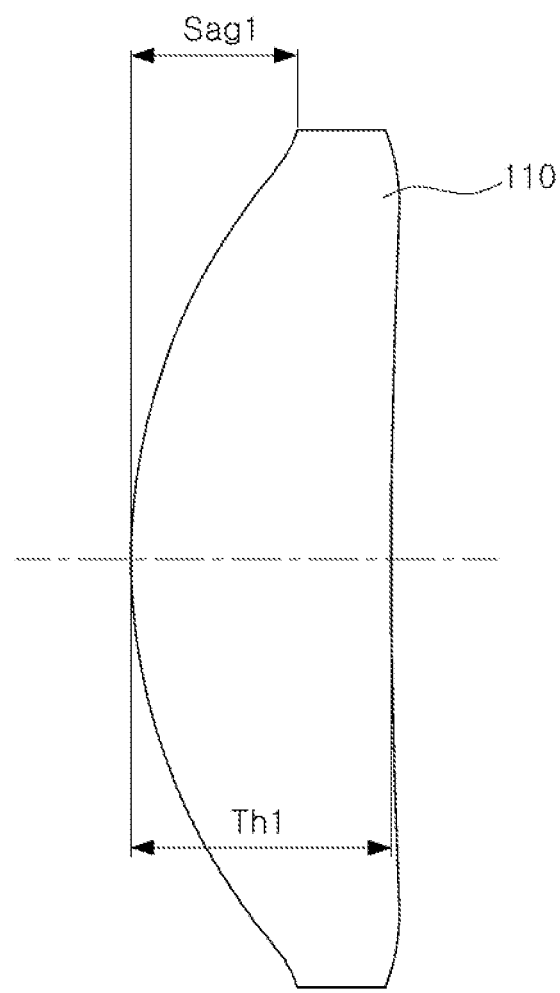
FIG. 7 is an enlarged view of a first lens illustrated in FIG. 1.

FIG. 7 is an enlarged view of a first lens illustrated in FIG. 1.

For reference, FIG. 7 is an enlarged view of the first lens 110 of the first example of an optical imaging system 100 illustrated in FIG. 1, but the following description is also applicable to the first lens 210 of the second example of an optical imaging system 200 illustrated in FIG. 3 and the first lens 310 of the third example of an optical imaging system 300 illustrated in FIG. 5.

A center thickness Sag1 of the object-side surface of the first lens 110 and a center thickness Th1 of the first lens 110 satisfy a predetermined conditional expression. In detail, a ratio of the center thickness Th1 of the first lens 110 to the center thickness Sag1 of the object-side surface of the first lens 110 is greater than 1.5, that is, 1.5<Th1/Sag1, which is Conditional Expression 8 described above. Sag1 is a maximum distance measured parallel to an optical axis of the first lens 110 between a tangential plane meeting the apex of the object-side surface of the first lens 110 and the object-side surface of the first lens 110.

Table 7 below lists values of Conditional Expressions 1 through 16 described above for the first through third examples of the optical imaging systems 100, 200, and 300 described above.

TABLE 7

| Conditional Expression | First Example | Second Example | Third Example |
|---|---|---|---|
| F No. | 1.5700 | 1.5700 | 1.5500 |
| TTL/ImgH | 1.4014 | 1.3963 | 1.3926 |
| FOV | 76.720 | 76.500 | 76.460 |
| (R11 + R12)/ (R11 − R12) | 0 | 0 | 0 |
| (R9 − R10)/ (R9 + R10) | 0 | 0 | 0 |

TABLE 7-continued

| Conditional Expression | First Example | Second Example | Third Example |
|---|---|---|---|
| V1 − V2 | 35.741 | 35.741 | 35.741 |
| V3 − V4 | 0 | 0 | 0 |
| Th1/Sag1 | 1.5400 | 1.5400 | 1.5400 |
| V7 | 55.656 | 55.656 | 55.656 |
| Nd2 | 1.6610 | 1.6610 | 1.6610 |
| Nd5 | 1.6610 | 1.6500 | 1.6500 |
| Nd6 | 1.6390 | 1.6140 | 1.6140 |
| (Nd2 + Nd5 + Nd6)/3 | 1.6537 | 1.6417 | 1.6417 |
| (Nd2 + Nd3 + Nd4 + Nd5 + Nd6)/5 | 1.6098 | 1.6026 | 1.6026 |
| |f5/f| | 2843459.0 | 2767247.2 | 3378513.0 |
| |f6/f| | 181.990 | 188.961 | 189.843 |

The values of V1-V2, V3-V4, and V7 in the above Table 7 were obtained from values of V1=56.094, V2=20.353, V3=56.094, V4=56.094, and V7=55.656 that are more precise than the rounded values of V1=56.1, V2=20.4, V3=56.1, V4=56.1, and V7=55.7 listed in Tables 1, 3, and 5 above.

The examples of an optical imaging system described above increase the performance of a small camera module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens having positive refractive power, and a concave image-side surface in a paraxial region;
a second lens having a negative refractive power;
a third lens having a convex object-side surface in a paraxial region thereof;
a fourth lens having a refractive power;
a fifth lens having a refractive power;
a sixth lens having a convex object-side surface in a paraxial region thereof; and
a seventh lens having negative refractive power,
wherein the first to seventh lenses are sequentially disposed in ascending numerical order from an object side of the optical imaging system toward an imaging plane of the optical imaging system,
wherein the optical imaging system comprises a total of seven lenses with refractive power,
wherein a thickness of the fourth lens is greater than a distance from an image-side surface of the third lens to an object-side surface of the fourth lens,
wherein a distance from an image-side surface of the fourth lens to an object-side surface of the fifth lens is greater than a thickness of the second lens,
wherein a radius of curvature of an object-side surface of the second lens is greater than a radius of curvature of an image-side surface of the first lens,
wherein a radius of curvature of an image-side surface of the fourth lens is greater than a radius of curvature of an object-side surface of the third lens, and
wherein a refractive index of the second lens is 1.65 or greater.

2. The optical imaging system of claim 1, wherein the first lens has a convex object-side surface in a paraxial region thereof.

3. The optical imaging system of claim 1, wherein the second lens has a convex object-side surface in a paraxial region thereof.

4. The optical imaging system of claim 1, wherein the fourth lens has a convex object-side surface in a paraxial region thereof.

5. The optical imaging system of claim 1, wherein the fifth lens has a concave object-side surface in a paraxial region thereof.

6. The optical imaging system of claim 1, wherein the seventh lens has a convex object-side surface in a paraxial region thereof.

7. The optical imaging system of claim 1, wherein the seventh lens has a concave image-side surface in a paraxial region thereof.

8. An optical imaging system, comprising:
a first lens having positive refractive power, and a concave image-side surface in a paraxial region;
a second lens having a negative refractive power;
a third lens having a convex object-side surface in a paraxial region thereof, and a concave image-side surface in a paraxial region thereof;
a fourth lens having a refractive power;
a fifth lens having a refractive power;
a sixth lens having a convex object-side surface in a paraxial region thereof; and
a seventh lens having negative refractive power,
wherein the first to seventh lenses are sequentially disposed in ascending numerical order from an object side of the optical imaging system toward an imaging plane of the optical imaging system,
wherein the optical imaging system comprises a total of seven lenses with refractive power,
wherein a thickness of the fourth lens is greater than a distance from an image-side surface of the third lens to an object-side surface of the fourth lens,
wherein a distance from an image-side surface of the fourth lens to an object-side surface of the fifth lens is greater than a thickness of the second lens,
wherein a radius of curvature of an object-side surface of the second lens is greater than a radius of curvature of an image-side surface of the third lens,
wherein a refractive index of the second lens is 1.65 or greater, and
wherein 55<V7, where V7 is an Abbe number of the seventh lens.

9. The optical imaging system of claim 8, wherein the first lens has a convex object-side surface in a paraxial region thereof.

10. The optical imaging system of claim 8, wherein the second lens has a convex object-side surface in a paraxial region thereof.

11. The optical imaging system of claim 8, wherein the fourth lens has a convex object-side surface in a paraxial region thereof.

12. The optical imaging system of claim 8, wherein the fifth lens has a concave object-side surface in a paraxial region thereof.

13. The optical imaging system of claim 8, wherein the seventh lens has a convex object-side surface in a paraxial region thereof.

14. The optical imaging system of claim 8, wherein the seventh lens has a concave image-side surface in a paraxial region thereof.

* * * * *